US009685076B2

(12) United States Patent
Mieth et al.

(10) Patent No.: US 9,685,076 B2
(45) Date of Patent: Jun. 20, 2017

(54) GENERATING SEGMENT DATA

(75) Inventors: Peter Mieth, Berlin (DE); Stefan Lorkowski, Berlin (DE); Ralf-Peter Schäfer, Berlin (DE); Nikolaus Witte, Berlin (DE)

(73) Assignee: TomTom Traffic B.V., Amsterdam (NL)

( * ) Notice: Subject to any disclaimer, the term of this patent is extended or adjusted under 35 U.S.C. 154(b) by 0 days.

(21) Appl. No.: 13/983,611

(22) PCT Filed: Feb. 2, 2012

(86) PCT No.: PCT/EP2012/051801
§ 371 (c)(1),
(2), (4) Date: Aug. 5, 2013

(87) PCT Pub. No.: WO2012/104392
PCT Pub. Date: Aug. 9, 2012

(65) Prior Publication Data
US 2013/0317744 A1 Nov. 28, 2013

Related U.S. Application Data

(60) Provisional application No. 61/439,011, filed on Feb. 3, 2011.

(30) Foreign Application Priority Data

Jul. 29, 2011 (GB) .................................. 1113122.4

(51) Int. Cl.
*G01C 21/34* (2006.01)
*G08G 1/123* (2006.01)
(Continued)

(52) U.S. Cl.
CPC ............... *G08G 1/00* (2013.01); *G01C 21/32* (2013.01); *G01C 21/3492* (2013.01);
(Continued)

(58) Field of Classification Search
USPC .................................. 701/117–119, 414, 423
See application file for complete search history.

(56) References Cited

U.S. PATENT DOCUMENTS 5,428,545 A 6/1995 Maegawa et al.
6,317,686 B1 11/2001 Ran
(Continued)

FOREIGN PATENT DOCUMENTS

CN 101488284 A 7/2009
CN 102288193 A 12/2011
(Continued)

OTHER PUBLICATIONS

International Search Report issued Jul. 2, 2012 for International Application No. PCT/EP2012/051802.
(Continued)

*Primary Examiner* — Imran Mustafa

(57) ABSTRACT

A method of processing data relating to an electronic map, the map comprising a plurality of segments representing navigable segments in the area covered by the map, the method comprising using a processing apparatus to generate segment data and comprising the steps of: collecting historic travel data for the segment; defining a jam condition for the segment, such that where the jam condition is satisfied the segment is classified as jammed and otherwise as not jammed; generating a jam probability for the segment according to the historic travel data and the jam condition definition; generating a jam speed for the segment using the historic travel data, the jam speed being indicative of the speed on the segment when the segment is considered jammed; and associating the jam probability and the jam speed with the segment in the electronic map.

10 Claims, 11 Drawing Sheets

(51) Int. Cl.
*G08G 1/00* (2006.01)
*G01C 21/32* (2006.01)
*G08G 1/01* (2006.01)
*G08G 1/0968* (2006.01)

(52) U.S. Cl.
CPC ......... *G08G 1/0112* (2013.01); *G08G 1/0129* (2013.01); *G08G 1/0141* (2013.01); *G08G 1/09685* (2013.01); *G08G 1/096816* (2013.01); *G08G 1/096883* (2013.01); *G08G 1/012* (2013.01); *G08G 1/0116* (2013.01)

(56) References Cited

U.S. PATENT DOCUMENTS

| | | | |
|---|---|---|---|
| 7,617,041 | B2 | 11/2009 | Sera |
| 7,702,452 | B2 | 4/2010 | Kantarjev et al. |
| 7,706,964 | B2 | 4/2010 | Horvitz |
| 7,813,870 | B2 | 10/2010 | Downs et al. |
| 9,026,358 | B2 | 5/2015 | Harris |
| 2002/0128766 | A1 | 9/2002 | Petzold et al. |
| 2006/0074551 | A1* | 4/2006 | Zaitsu ............. G08G 1/096844 701/117 |
| 2006/0089787 | A1* | 4/2006 | Burr et al. .................... 701/202 |
| 2007/0208494 | A1* | 9/2007 | Chapman ............. G08G 1/0104 701/117 |
| 2008/0004789 | A1 | 1/2008 | Horvitz |
| 2008/0071465 | A1 | 3/2008 | Chapman et al. |
| 2008/0312811 | A1* | 12/2008 | Yamane ............. G08G 1/0104 701/118 |
| 2009/0118996 | A1 | 5/2009 | Kantarjev et al. |
| 2009/0326805 | A1 | 12/2009 | Harris |
| 2010/0235077 | A1 | 9/2010 | Chan |
| 2011/0106416 | A1 | 5/2011 | Scofield et al. |
| 2012/0166071 | A1 | 6/2012 | Shirahatti et al. |

FOREIGN PATENT DOCUMENTS

| | | | |
|---|---|---|---|
| CN | 102346964 | A | 2/2012 |
| DE | 102004024259 | A1 | 12/2005 |
| EP | 0638887 | A2 | 2/1995 |
| EP | 1437573 | A2 | 7/2004 |
| EP | 1640691 | A2 | 3/2006 |
| EP | 1736735 | A1 | 12/2006 |
| EP | 2180456 | A1 | 4/2010 |
| JP | H1079094 | A | 3/1998 |
| JP | 2000039331 | A | 2/2000 |
| JP | 2004234649 | A * | 8/2004 |
| JP | 2005122555 | A | 5/2005 |
| JP | 2005300229 | A | 10/2005 |
| JP | 2007011558 | A | 1/2007 |
| JP | 2007327975 | A | 12/2007 |
| JP | 2008102664 | A | 5/2008 |
| JP | 2009511357 | A | 3/2009 |
| JP | 2010020462 | A | 1/2010 |
| JP | 2010044526 | A | 2/2010 |
| JP | 2011008569 | A | 1/2011 |
| WO | 20070103123 | A2 | 9/2007 |
| WO | 2009053411 | A1 | 4/2009 |
| WO | 2010098887 | A1 | 9/2010 |

OTHER PUBLICATIONS

International Search Report issued Apr. 26, 2012 for International Application No. PCT/EP2012/051801.

Hojjat Salehinejad et al.; "A New Route Selection System: Multiparameter Ant Algorithm Based Vehicle Navigation Approach", Dec. 2008; Computational Itelligence for Modelling Control and Automation, 2008 International Conference on; pp. 1089-1094.

* cited by examiner

GENERATING SEGMENT DATA

CROSS-REFERENCES TO RELATED APPLICATIONS

This application is the National Stage of International Application No. PCT/EP2012/051801, filed on Feb. 2, 2012 and designating the United States. The application claims the benefit of U.S. Provisional Patent Application No. 61/439,011 filed Feb. 3, 2011 and United Kingdom Patent Application No. 1113122.4 filed Jul. 29, 2011. The entire content of all these applications is incorporated herein by reference.

FIELD OF THE INVENTION

The invention relates to a method of generating data in relation to one or more segments in the area covered by an electronic map as well as a system, a server and a navigation device on which part or all of the method may be implemented. In particular, but not exclusively, the invention relates to generating one or more jam probabilities for one or more segments. Generated segment data may in particular, but not exclusively, be used in route generation for navigation devices such as a Portable Navigation Device (PND).

BACKGROUND OF THE INVENTION

Map data for electronic navigation devices, such as GPS based personal navigation devices like the GO™ from TomTom International BV, comes from specialist map vendors. Such devices are also referred to as Portable Navigation Devices (PND's). This map data is specially designed to be used by route guidance algorithms, typically using location data from the GPS system. For example, roads can be described as lines—i.e. vectors (e.g. start point, end point, direction for a road, with an entire road being made up of many hundreds of such segments, each uniquely defined by start point/end point direction parameters). A map is then a set of such road vectors, data associated with each vector (speed limit; travel direction, etc.) plus points of interest (POIs), plus road names, plus other geographic features like park boundaries, river boundaries, etc., all of which are defined in terms of vectors. All map features (e.g. road vectors, POIs etc.) are typically defined in a co-ordinate system that corresponds with or relates to the GPS co-ordinate system, enabling a device's position as determined through a GPS system to be located onto the relevant road shown in a map and for an optimal route to be planned to a destination.

Typically, each such road segment has associated therewith a speed data for that road segment which gives an indication of the speed at which a vehicle can travel along that segment and is an average speed generated by the party that produced the map data. The speed data is used by route planning algorithms on PND's on which the map is processed. The accuracy of such route planning thus depends on the accuracy of the speed data. For example, a user is often presented with an option on his/her PND to have it generate the fastest route between the current location of the device and a destination. The route calculated by the PND may well not be the fastest route if the speed data is inaccurate.

It is known that parameters such as density of traffic can significantly effect the speed profile of a segment of road and such speed profile variations mean that the quickest route between two points may not remain the same. Inaccuracies in the speed parameter of a road segment can also lead to inaccurate Estimated Times of Arrival (ETA) as well as selection of a sub-optimal quickest route. Particularly problematic are jams which may significantly effect the quickest route between two points.

In an effort to improve accuracy it is known to collect live data relating to jammed traffic and to use this data to account for known jams in route planning. It will be appreciated that if the live data is to give a true indication of road conditions a large quantity is required: traffic flow has a strong stochastic component meaning that incident detection based on low levels of or infrequent live data is likely to be inaccurate. It may often be the case, however, that little or no live data is available for a segment and so its true condition may remain unpredictable.

SUMMARY OF THE INVENTION

According to a first aspect of the invention there is provided a method of generating expected average speeds of travel across one or more segments in the area covered by an electronic map each segment having associated therewith:
  an average speed of travel across that segment;
  segment data comprising at least one jam probability, the jam probability indicating the likelihood of a jam on that segment; and
  a jam speed indicative of the speed of travel on that segment when it is considered jammed; the method comprising:
  using the segment data to predict whether a jam condition exists on at least one or each of the segments;
  outputting the expected average speed of travel across these segments as:
  a) where a jam condition is predicted to exist, a first speed, the first speed being the jam speed for the relevant segment or a speed based thereon, or
  b) where a jam condition is not predicted, a second speed, the second speed being the average speed for the relevant segment or a speed based thereon.

This method allows prediction of the expected average speed of travel across a segment, including the prediction of reduced speed due to a jam, even where there is little or no live data available.

According to a further aspect of the invention there is provided a system arranged to generate expected average speeds of travel across one or more segments in the area covered by an electronic map, each segment having associated therewith:
  an average speed of travel across that segment;
  segment data comprising at least one jam probability, the jam probability indicating the likelihood of a jam on that segment; and
  a jam speed, indicative of the speed on that segment when it is considered jammed; the system comprising a processor arranged to:
  use the segment data to predict whether a jam condition exists on at least one of the segments; and
  output the expected average speed of travel across these segments as:
  a) where a jam condition is predicted to exist, a first speed, the first speed being the jam speed for the relevant segment or a speed based thereon, or
  b) where a jam condition is not predicted, a second speed, the second speed being the average speed for the relevant segment or a speed based thereon.

As will be appreciated the system and/or processor may be at least part of a server or a navigation device.

Accordingly the invention can encompass a server arranged to generate expected average speeds of travel across one or more segments in the area covered by an electronic map. Similarly, the invention can encompass a navigation device arranged to generate expected average speeds of travel across one or more segments in the area covered by an electronic map.

The average speed of travel across a segment can be based on historic data. For example, a historic average speed may be recorded directly, or may be calculated from a recorded historic travel time across the segment.

A segment may have a plurality of average speeds of travel associated therewith, e.g. with each average speed being representative of the average speed along the segment during a particular time period. In such embodiments, the second speed is preferably the average speed for the relevant segment at the appropriate time or a speed based thereon.

There are many ways in which historic travel times across the segment may be collected or generated e.g. time interval between a satellite navigation trace entering and exiting a segment, or time interval between two number plate recognition or blue tooth signal events, or recordal of time of departure and time of arrival, or even simulation according to traffic flow data.

In a preferred embodiment, an average speed associated with a segment can be determined according to the method described in WO 2009/053411; the entire contents of which is enclosed herein by reference. In this method a plurality of time-stamped position data is preferably captured/uploaded from a plurality of navigation devices, such as portable navigations devices (PNDs). This data is preferably divided into a plurality of traces, with each trace representing data received from a navigation device over a predetermined time period. An average may then be taken of the recorded speeds within each predetermined time period for each navigable segment.

It will be appreciated that in the paragraphs above and below the phrase 'average speed' is used. It will be appreciated however that in reality it may never be possible to know an average speed completely accurately. In some cases for example, average speeds calculated can only be as accurate as the equipment used to measure time and position. It will be appreciated therefore that wherever the phrase 'average speed' is used, it should be interpreted as the average speed as calculated based on measurements which may themselves have associated errors.

In this context the word historic should be considered to indicate data that is not live, that is data that is not directly reflective of conditions on the segment at the present time or in the recent past (perhaps within roughly the last five, ten, fifteen or thirty minutes). Historic average speeds and historic travel times may for example relate to events occurring days, weeks or even years in the past. While such data may not therefore be a result of monitoring present road conditions, it may still be relevant for calculation of jam probability for the segment. Use of historic data, rather than live data alone, may increase the quantity of relevant data available and may therefore allow a more accurate jam probability for the segment to be calculated. This may especially be the case where there is little or no live travel data available.

It should be noted that the phrase 'associated therewith' in relation to one or more segments should not be interpreted to require any particular restriction on data storage locations. The phrase only requires that the features are identifiably related to a segment. Therefore association may for example be achieved by means of a reference to a side file, potentially located in a remote server.

In some embodiments the method is used in determination of a route across an area covered by the electronic map, comprising:

i) exploring routes based on expected average speeds of travel across segments; and ii) generating a navigable route.

This system may allow timely interventions in routing based on jam probabilities specific to a segment. The decreased expected average speed of travel across the segment where there is a jam may be factored in when a route is generated. Because the method is based on jam probabilities taking account of historic data, jams may be usefully predicted even where there is little or no live data for the segment in question.

In some embodiments, where a jam condition is predicted to exist, a jam warning is issued. Such a warning may for example be issued from a server via a communication network to one or more navigation devices, e.g. such that the navigation devices can use this information when planning routes, providing traffic information or the like. The navigation devices may then in turn output the expected average speed of travel across the segment.

The steps of the method may be performed exclusively on a server, or some on a server and the others on a navigation device in any combination, or exclusively on a navigation device. Performance of one or more of the steps on the server may be efficient and may reduce the computational burden placed on a navigation device. Alternatively if one or more steps are performed on the navigation device, this may reduce any bandwidth required for network communication.

For example, in some embodiments, the step of determining a route across an area covered by the electronic map is performed on a server. In other embodiments, the output expected average speeds of travel across segments are sent to a navigation device (from a server) and the determination step is performed on the navigation device.

As discussed above, each segment in the electronic map has associated therewith a jam speed and at least one jam probability.

In some embodiments the jam speed is the average of all, or substantially all or a selection of average speeds of travel across that segment, when that segment is considered jammed. In other embodiments however the mode or a percentile of all or substantially all or a selection of historic average speeds of travel across that segment, when that segment is considered jammed may be used.

Each segment preferably also has a jam threshold speed associated therewith, the jam threshold speed indicating an average speed of travel across that segment below which the segment is considered jammed. In other words, the jam threshold speed is selected such that an average speed of travel across the segment below the jam threshold speed can be classified as jammed, whereas an average speed of travel across the segment above the jam threshold speed can be considered not jammed.

In some embodiments the jam threshold speed is defined according to a selected percentage of the free-flow speed for the segment. In alternative embodiments however the jam threshold speed may be alternatively defined, e.g. a predefined value corresponding to the road type or a particular speed simply considered to be indicative of jammed traffic.

The free-flow speed for a road segment is preferably defined as the average speed of travel across the segment during a period of time in which there is no or substantially little traffic. This period may for example be one or more night-time hours where speed over the segment may be less influenced by other users. Such measurements of free-flow speeds will still reflect the influence of speed limits, road layout and traffic management infrastructure for example. This may therefore be a more accurate reflection of the true free-flow speed than posted speed limits, legal speeds or speed assignments based on road category. In other embodiments however the free-flow speed may be calculated or selected differently (it may for example simply be taken to be the speed limit for the segment).

In some embodiments the selected percentage of the free-flow speed is between 30% and 70%, more preferably is between 40% and 60%, and most preferably is substantially 50%.

In some embodiments a pre-defined upper limit may be used as the jam threshold speed where the method of defining the jam threshold speed would otherwise result in the use of a higher speed. It may be for example that the method of defining the jam threshold speed might in a particular case result in a speed considered too high to be jammed for the particular segment. In that case the jam threshold speed may default to the upper limit.

The jam probability for a particular segment can be generated according to historic travel data for the segment and a jam condition for the segment, wherein the jam condition indicates whether the segment is jammed or not.

The manner by which the jam probability for a segment is generated is believed to be new and advantageous in own right.

Accordingly, in a further aspect of the invention, there is provided a method of processing data relating to an electronic map, the map comprising a plurality of segments representing navigable segments in the area covered by the map, the method comprising using a processing apparatus to generate segment data and comprising the steps of:

collecting historic travel data for the segment;

defining a jam condition for the segment, such that when the jam condition is satisfied the segment is classified as jammed and otherwise as not jammed;

generating a jam probability for the segment according to the historic travel data and the jam condition definition; and associating the jam probability with the segment in the electronic map.

In a further aspect of the invention there is provided a system arranged to process data relating to an electronic map, the map comprising a plurality of segments representing navigable segments in the area covered by the map, and to generate segment data by:

collecting or receiving historic travel data for the segment;

defining or receiving as an input a jam condition for the segment, such that when the jam condition is satisfied the segment is classified as jammed and otherwise as not jammed;

generating a jam probability for the segment according to the historic travel data and the jam condition definition; and associating the jam probability with the segment in the electronic map.

As will be appreciated the system and/or processor may be at least part of a server or a navigation device.

Accordingly the invention can encompass a server arranged to process data relating to an electronic map and to generate segment data. Similarly, the invention can encompass a navigation device arranged to process data relating to an electronic map and to generate segment data.

In some embodiments the jam probability is used by the server in generating a route. It may be for example that the server avoids generating a route incorporating a segment having a high jam probability.

In some embodiments the generated jam probability is sent from a server to one or more navigation devices. One or more of the navigation devices may in turn use the jam probability to generate a route.

As will be appreciated by those skilled in the art, these aspects and embodiments of the present invention can and preferably do include any one or more or all of the preferred and optional features of the invention described herein, as appropriate.

Thus, for example, the jam condition is preferably a jam threshold speed, which can be defined according to a selected percentage of the free-flow speed for the segment.

In some embodiments a jam condition is predicted when the jam probability for that segment exceeds a pre-defined value. It may be for example that where the jam probability exceeds substantially 70% or another relatively high percentage such as substantially any of the following: 50%, 60%, 80% or 90%, that a jam condition is predicted and optionally a jam warning issued.

In some embodiments, multiple jam probabilities are associated with each segment. In particular there may be multiple time dependent jam probabilities for that segment reflecting variations in jam probability over time for selected time intervals. In this way when prediction of whether a jam condition exists is performed, a jam probability for the appropriate time may be used. It may be for example that jam probabilities are calculated according to the time of the year, the day of the week and/or the time of day. In some embodiments jam probabilities are provided at time intervals between 1 minute and 2 hours, between 5 minutes and 1 hour, between 10 minutes and 30 minutes or at time intervals of 15 minutes.

As will be appreciated a jam probability is likely to vary depending on the time of day, the day of the week and even the time of year. Consequently the provision of multiple time dependent jam probabilities is likely to give more accurate jam condition prediction than a single jam probability for a segment.

In some embodiments one or more alternative jam probabilities are provided for use with a segment within corresponding time periods allowing selection of the most appropriate jam probability at any given time based on one or more factors other than time dependent variation. Selection of an alternative jam probability for use may be appropriate in particular situations, for example in different weather conditions, or where a particular event such as a football game is occurring. Such situations may be considered factors other than time dependent variation. Such situations may be considered atypical. As will be appreciated the provision of such alternative jam probabilities may be dependent on the availability of sufficient historic data to create an accurate jam probability.

In some embodiments alternative sets of time dependent jam probabilities are provided allowing selection of the most appropriate jam probability based both on the time and on other factors. It may be for example that one set of time dependent jam probabilities is used if the weather is dry and another set if there is rain.

In some embodiments the jam probability for a segment is calculated according to the ratio of the number of calculated average speeds of travel across the segment above and below the jam threshold speed. By way of example, a collection of GPS probes giving historic travel times across the segment might be analysed. In this case the number of probes requiring an average speed across the segment above and below the jam threshold speed might be compared. In one example, the ratio of jammed and not jammed probes might be 70:30, giving a jam probability of 30%.

In some embodiments the jam probability for the segment is calculated according to the time periods for which the segment is jammed and not jammed, e.g. the period for which the historic average speeds of travel indicate that the jam condition is satisfied.

In some embodiments, where segments are concatenated, the average percentage of segments jammed may be used to calculate the jam probability for one, some or all of the concatenated segments.

In embodiments, where multiple time dependent jam probabilities are associated with a segment, the historic travel data is grouped according to time of recordal. For example the historic travel data may be grouped together if they have been received within a predetermined time period. The predetermined time period may be, for example, 5 minutes, 10 minutes, 15 minutes, 20 minutes, 30 minutes or 1 hour. In this way a generated jam probability may be time related and may therefore be accurate when used in the prediction of jams at a corresponding time. It may be for example that the historic segment data and so the jam probability for a segment relate to the period between 8.30 am and 8.45 am on Monday mornings during the months of December to February. Therefore when this jam probability is used on Monday mornings in the corresponding months at the corresponding time it may be a better predictor of jams than a non-time dependent jam probability.

In some embodiments jam probabilities are calculated according to or are at least influenced by the time of the year. This may serve to increase jam probability accuracy as jam probability may vary depending on seasonal influences such as prevailing weather and road surface condition.

In some embodiments jam probabilities are calculated according to or are at least influenced by the day of the week. This may serve to increase jam probability accuracy as jam probability may vary depending on day of the week dependent factors such as weekend shopping, Friday travel for a weekend away, haulage schedules and Monday long-distance commuting.

In some embodiments jam probabilities are calculated according to or are at least influenced by the time of day. This may serve to increase jam probability accuracy as jam probability may vary depending on time of the day dependent factors such as rush hours, school runs, opening and closing times (e.g. bars, restaurants, theatres, concert venues, cinemas, clubs etc) start and finish times (e.g. festivals, shows and sporting events etc), arrival and departure times (e.g. trains, ships and aircraft) and widespread commonality of activity (e.g. eating or sleeping). In some embodiments there may for example be a single jam probability for night. Night may be a predefined period between set times e.g. between substantially 11 pm and 6 am.

In some embodiments jam probabilities are calculated for substantially fifteen minute time intervals. However time intervals above or below this may be used e.g. 5 minutes, 10 minutes, 15 minutes, 20 minutes, 30 minutes, 1 hour or longer periods such as the night. Further calculated jam probabilities that are adjacent in time may be concatenated. This may be particularly useful where the jam probabilities are similar (e.g. potentially night time hours).

In some embodiments jam probabilities are calculated according to or are at least influenced by the occurrence of a particular event or situation. Such events or situations may for example include particular types of weather, events such as football matches or exhibitions and public holidays and the like.

In some of the embodiments, the jam probabilities are calculated or at least influenced by more than one of the factors discussed above.

As discussed above, when a jam condition is predicted to exist, the expected average speed of travel across the segment is the jam speed for the relevant segment or a speed based thereon (the "first speed"). For example the jam speed for a segment could be modified in accordance with one or more dynamic parameters, such as weather.

Similarly, and again as discussed above, when a jam condition is not predicted, the expected average speed of travel across the segment is the average speed for the relevant segment (and for example at the appropriate time) or a speed based thereon (the "second speed").

For example the second speed can be the average of all, or substantially all or a selection of historic average speeds of travel across that segment. In other embodiments however the mode or a percentile of all or substantially all or a selection of historic average speeds of travel across that segment may be used. Alternatively a speed may be selected in another way.

In some embodiments the segment data for one or more of the segments further comprises live data for that segment.

Live data may be thought of as data which is relatively current and provides an indication of what is occurring on the segment. The live data may typically relate to the conditions on the segment within the last 30 minutes. In some embodiments the live data may relate to conditions on the segment within the last 15 minutes, 10 minutes or 5 minutes.

In some embodiments jam probability for a segment can be generated or modified based on live data for that segment. In other words the jam probability can be calibrated using live data.

As will be appreciated the use of live data in addition to the historic average speeds of travel across a segment can significantly increase the accuracy of the jam probability for the segment. For example historic data for a segment may indicate a high likelihood that the segment is jammed at a particular point of time, whereas in reality live data indicates the segment is not in fact jammed.

In some embodiments live data is alternatively or additionally used as a check to increase the likelihood of correctly predicting whether a jam condition exists on the relevant segment. In this case therefore at least some live data is not used to calibrate the jam probability but to check a prediction based on it. This may be through comparison of the live data with the relevant jam probability, with the data used in calculation of the jam probability and/or with the prediction.

In some embodiments an optimizer is used to fuse available data. The optimizer can also therefore be thought of as a data fusion means arranged to combine historic data with live data, e.g. to determine what the average speed of travel along a segment should be deemed to be. In this way live data may be used to calibrate the relevant jam probability calculated using historic average speeds of travel across that segment. Additionally and/or alternatively the fusion may allow the check to be performed.

In some embodiments the optimizer is automated. The optimizer may for example be a parameter optimising scheme using an amoeba algorithm, or a manual result analysis.

In some embodiments the fusion is performed using a weighted or probabilistic average. In particular greater weight may be given to live data if a greater quantity of it is available and/or if it perceived to be more reliable and/or significant. As will be appreciated small quantities of live data may be stochastic in nature and so may serve to unduly distort the jam condition prediction. Conversely, the more live data is available the more useful it becomes to the point where it will eventually prove a more accurate predictor of whether a jam condition exists than historic average travel speeds across the segment. Where more live data is available for a segment the weighted average may favour the live data and even reduce the weighting of the historic travel times so as they become relatively insignificant.

In some embodiments the jam probability required for a jam condition to be predicted is increased if less live data has been used in the fusion. By adjusting the required jam probability the method may account for increased uncertainty where there is little or no live data.

In some embodiments a lower threshold cut-off may be set for the quantity of live data available if it is to be fused. As mentioned previously, small quantities of live data may be stochastic in nature and may therefore serve to distort the true condition of the segment. In such instances it may therefore be preferable to avoid using the live data altogether, the lower threshold defining this cut-off point.

In some embodiments the live data comprises one or more live travel times over at least one of the or each segment. The live travel time may typically be calculated from GPS probes. This data may be relevant as it may provide an up to date indication of the actual situation on a segment. The live travel times may also be calculated from any of the following: data from cellular telephone networks; road loop generated data; traffic cameras (including ANPR—Automatic Number Plate Recognition).

In some embodiments the optimizer uses live travel times relating to the relevant segment in the function used to calculate the jam probability, factoring in live travel times requiring average speeds above and live travel times requiring average speeds below the jam threshold speed. In this way the jam probability associated with the segment may be calibrated. The prospects for an accurate jam condition prediction may therefore be improved. Nonetheless because historic travel times are always used, the method is not dependent on large quantities/any live data being available. It will be appreciated that while quantities of live data sufficient in isolation to give an accurate jam prediction may be available for some or even most segments, it may not be available for all.

In some embodiments live data comprises information on one or each of the segments from one or more of the following sources:

a calendar indicating identified days and/or times where unusual traffic is expected for the segment;

journalistic data indicating jams;

the number of GPS probes detected on the segment; and a weather monitoring and/or prediction service.

Journalistic data may comprise traffic reports from broadcasters and/or other reports from news outlets on factors having or likely to have an effect on traffic.

In this way live data pertaining to the weather, local events, public holidays and disasters for example may be factored into predicting whether a jam condition exists. Such data may be more suited to the performance of a check rather than being factored into the calculation of the jam probability. It will be appreciated that in some circumstances such live data may be as useful or even more useful than live data comprising live travel times over the segment. Where for example journalistic data indicates a traffic jam in a particular segment, it may be that the optimizer weights this information heavily as likely being correct. Live data that is particularly recent may also be weighted more heavily; that is more recent live data may be weighted more highly than less recent live data. By way of another example, heavy rain as forecasted by a weather prediction service may increase the likelihood of slow traffic, and so this may be utilised by the optimizer to correctly identify the cause of slow moving traffic as weather conditions and not a jam.

In some embodiments live data for one or each of the segments is checked for consistency with the jam probability and/or historic travel times when used for its calculation and/or a prediction of whether a jam condition exists based on the jam probability. This may be considered a local check as it is concerned with particular segments that may not be related rather than a set of segments or the entire network.

Where the live data is inconsistent with the jam probability and/or historic travel times used for its calculation and/or a prediction of whether a jam condition exists based on the jam probability, one or more of the following steps may be undertaken:

i) the jam probability required in order for a jam condition to be predicted is adjusted;

ii) live data or additional live data is used in the jam probability calculation; iii) the weighted or probabilistic average is adjusted to favour or further favour live data;

iv) the inconsistency is used to over-ride a jam condition prediction or make a jam condition prediction where one would not otherwise be made; and v) initiating a switch to use of one or more different jam probabilities more consistent with the live data.

By taking one or more of the above steps, the accuracy of jam condition prediction may be improved. It may be for example that the live data, e.g. through conflict with the jam probability, indicates that at the present time, conditions are unusual, i.e. the jam probability (which may be exclusively based on historic average speeds of travel across that segment) is not a good guide as to whether or not a jam condition exists. Mitigating action may therefore be taken, e.g. by over-riding an imminent issue of a jam warning.

Where data quantity allows, it may be that one or more alternative sets of jam probabilities are available for the segment. Such jam probabilities may relate to particular potentially recurring situations (such as a football game in the local area, a bank holiday or severe weather). In this case, where the live data indicates that such an alternative set of jam probabilities is more relevant, option (v) may be taken.

In some embodiments live data for a set of segments is checked for consistency with their respective jam probabilities and/or historic travel times when used for their calculation and/or predictions of whether jam conditions exist based on the jam probabilities. This may be considered a regional check as it is concerned with a set of segments.

Where the check indicates a deviation trend from jam probabilities and/or historic travel times used for their calculation and/or predictions of whether jam conditions exist based on the jam probabilities, one or more of the following steps may be undertaken for segments in the set and/or other relevant segments:

i) the jam probability required in order for a jam condition to be predicted is adjusted;

ii) live data or additional live data is used in the jam probability calculation;

iii) the weighted or probabilistic average is adjusted to favour or further favour live data;

iv) the inconsistency is used to over-ride a jam condition prediction or make a jam condition prediction where one would not otherwise be made; and v) initiating a switch to use of one or more different jam probabilities more consistent with the live data.

In this way alterations may be undertaken in accordance with patterns/trends (such as jam probability deviation patterns) observed in a set of segments. Checks performed on a set of segments may allow inferences to be drawn with regard to the likelihood of a jam condition on segments within the set. Such inferences may be at odds with jam probabilities. Further inferences may be made for segments not within the set, for example nearby segments likely to be influenced by conditions on one or more segments in the set. It may be for example that the check indicates that the majority or even all segments in the set are jammed, contrary to jam probability indications. This may in turn be interpreted to indicate that places with high jam probabilities are even more likely than usual to be jammed and that this should be accounted for in predicting whether jam conditions exist.

In some alternative embodiments a deviation trend may lead to a partial or complete over-riding of the use of jam probabilities for a period. It may be for example that the live data indicates that the jam probabilities are completely inappropriate for use in predicting whether jam conditions exist for a particular period.

In some embodiments the set of segments may comprise one or more of the following: segments falling within a predetermined map area, segments falling within a predetermined radius, segments comprising likely routes into or out of an area, segments within an area having predetermined travel directions and segments selected as known bottle-necks, and segments selected as containing a traffic hotspot. It may be for example that the set comprises segments forming what may be considered major routes out of a city. Such a set may for example be of use at the beginning of a bank holiday period, where jams on major routes out of a city may be more likely.

In some embodiments live data for a set of linked segments is evaluated for significant variation between them in consistency between the live data for each segment and the jam probability for the segment. This may serve to assist in predicting a jam condition. Where for example live data for an upstream segment is more consistent with its respective jam probability for the segment, this may reinforce a jam condition prediction for a downstream segment. An upstream segment is a segment that for a given direction of travel feeds traffic from itself to the segment in question. Further, chains of step-wise changes in consistency over linked segments may indicate the length of a queue and therefore improve jam condition prediction.

In some embodiments selection of the set of segments is hierarchically organised. This may be achieved via a grid refinement procedure depending on live data coverage. It may be for example that segments where more live data is available are prioritised for incorporation in the set.

In some embodiments live data for all segments in a mapped network is checked for consistency with respective jam probabilities and/or historic travel times when used for their calculation and/or predictions of whether jam conditions exist based on the jam probabilities. This may be considered a global check as it is concerned with an entire mapped network.

Where the check indicates a deviation trend from jam probabilities and/or historic travel times used for their calculation and/or predictions of whether jam conditions exist based on the jam probabilities, one or more of the following steps may be undertaken for all segments:

i) the jam probability required in order for a jam condition to be predicted is adjusted;

ii) live data or additional live data is used in the jam probability calculation;

iii) the weighted or probabilistic average is adjusted to favour or further favour live data;

iv) the inconsistency is used to over-ride a jam condition prediction or make a jam condition prediction where one would not otherwise be made; and v) initiating a switch to use of one or more different jam probabilities more consistent with the live data.

In this way alterations may be undertaken in accordance with patterns observed by checks performed on all segments. Checks performed on all segments may allow inferences to be drawn with regard to the likelihood of a jam condition on segments. Checks of this type may be useful where a phenomenon likely to influence an entire network occurs.

In some embodiments jam condition predictions for neighbouring segments may be concatenated into one jam. This may present a more realistic indication of the situation.

Embodiments of the method may be performed by an offline navigation device. In this way a navigation device not connected to a communication network may still employ embodiments of the invention.

Where the method is performed by an offline navigation device, live data may be provided by evaluation of information collected by the navigation device. Such data may in some cases serve as a substitute for alternative forms of live data described previously.

Where live data is collected by the navigation device this may be checked for consistency with the relevant jam probability and/or historic travel times when used in its calculation and/or a prediction of whether a jam condition exists based on the jam probability. This may provide an indication of the relevance of a particular jam probability.

Where the live data is inconsistent with the jam probability and/or historic travel times used in its calculation and/or a prediction of whether a jam condition exists based on the jam probability one or more of the following steps may be undertaken for one or more segments:

i) the jam probability required in order for a jam condition to be predicted is adjusted;

ii) live data or additional live data is used in the jam probability calculation;

iii) the weighted or probabilistic average is adjusted to favour or further favour live data;

iv) the inconsistency is used to over-ride a jam condition prediction or make a jam condition prediction where one would not otherwise be made; and v) initiating a switch to use of one or more different jam probabilities more consistent with the live data.

It may be for example that the navigation device detects that it is currently in a jam and yet otherwise a jam condition prediction would not be made based on the jam probability. This may prompt a calibration or check on the jam probability for the segment in question but also optionally for additional segments. Calibration or a check on the jam probabilities for additional segments may occur where such segments may be affected by conditions on the segment in question and/or are considered similar in nature to the segment in question. Additionally or alternatively an estimated journey time or estimated time of arrival based on route calculation utilising jam probabilities may differ from an actual time of arrival. This actual time of arrival may be used to calibrate or check one or more jam probabilities used in generating the estimated journey time/estimated time of arrival.

It is believed that the concept of using live data obtained for one or more segments in an area to confirm or modify the jam probability for a segment for which there is little or no live data is new and advantageous in its own right.

Thus according to a further aspect of the invention there is provided a method of generating map data indicating a deviation from expected jam conditions on a segment of a plurality of segments in an area covered by an electronic map, the segment having associated therewith a jam probability indicating the likelihood of a jam on that segment, the method comprising:

establishing an expected jam condition for the segment based on the jam probability of that segment;

obtaining live data indicating the jam conditions on at least one of the plurality of other segments in the area; and, establishing a revised jam condition for the segment using the obtained live data.

As will be appreciated, this method allows a more accurate determination of the jam conditions on a segment even when no live data can be obtained for the segment. In others words, an inference is made that if, for example, live data indicates a substantial number of segments in a region are jammed at a given time, then there is a high likelihood that a connected segment in the region will also be jammed even if historic data suggests this not to be the case.

According to a further aspect of the invention there is provided a system arranged to generate map data indicating a deviation from expected jam conditions on a segment of a plurality of segments in an area covered by an electronic map, the segment having associated therewith a jam probability indicating the likelihood of a jam on that segment, the method comprising:

establishing an expected jam condition for the segment based on the jam probability of that segment;

obtaining live data indicating the jam conditions on at least one of the plurality of other segments in the area; and, establishing a revised jam condition for the segment using the obtained live data.

As will be appreciated the system and/or processor may be at least part of a server or a navigation device.

Accordingly the invention can encompass a server arranged to generate the map data indicating a deviation from expected jam conditions on a segment in an area covered by an electronic map. Similarly, the invention can encompass a navigation device arranged to generate the map data indicating a deviation from expected jam conditions on a segment in an area covered by an electronic map.

As will be appreciated by those skilled in the art, these aspects and embodiments of the present invention can and preferably do include any one or more or all of the preferred and optional features of the invention described herein, as appropriate.

For example, the revised jam condition for a segment can be used to assign an suitable average speed of travel to the segment, e.g. for use in generating a route from an origin to a destination.

As discussed above, live data may be thought of as data which is relatively current and provides an indication of what is occurring on the segment. The live data may typically relate to the conditions on the segment within the last 30 minutes. In some embodiments the live data may relate to conditions on the segment within the last 15 minutes, 10 minutes or 5 minutes.

The step of establishing a revised jam condition for the segment can comprise checking or modifying the jam probability for the segment based on the live data. For example, one or more of the following steps may be undertaken:

i) the jam probability required in order for a jam condition to be predicted is adjusted;

ii) live data or additional live data is used in the jam probability calculation;

iii) the weighting given to live data in predicting whether a jam condition exists is adjusted to favour or further favour live data;

iv) a jam condition prediction is over-ridden or a jam condition prediction is made where one would not otherwise be made; and v) a switch is initiated to use one or more different jam probabilities more consistent with the live data.

In this way alterations may be undertaken in accordance with patterns (such as jam probability deviation patterns) observed in the set of segments. Checks performed on the set of segments may allow inferences to be drawn with regard to the likelihood of a jam condition on segments within the set. Such inferences may be at odds with jam probabilities. Further inferences may be made for segments not within the set, for example nearby segments likely to be influenced by conditions on one or more segments in the set. It may be for example that the check indicates that the majority or even all segments in the set are jammed, contrary to jam probability indications. This may in turn be interpreted to indicate that places with high jam probabilities are even more likely than usual to be jammed and that this should be accounted for in predicting whether jam conditions exist.

In some alternative embodiments a deviation trend may lead to a partial or complete over-riding of the use of jam probabilities for a period. It may be for example that the live data indicates that the jam probabilities are completely inappropriate for use in predicting whether jam conditions exist for a particular period.

In some embodiments the set of segments may comprise segments falling within a predetermined map area, segments falling within a predetermined radius, segments within an area having predetermined travel directions or segments selected as known bottle-necks, and segments selected as containing a traffic hotspot or the like. It may be for example that the set comprises segments forming what may be considered major routes from an area such as out of a city. Such a set may for example be of use at the beginning of a bank holiday period, where jams on major routes out of a city may be more likely.

In some embodiments selection of the set of segments is hierarchically organised. This may be achieved via a grid refinement procedure depending on live data coverage. It may be for example that segments where more live data is available are prioritised for incorporation in the set.

According to another aspect of the invention there is provided a method of generating map data indicating a deviation trend from expected jam conditions on a set of segments in an area covered by an electronic map, each segment having associated therewith:

a jam probability, the jam probability indicating the likelihood of a jam on that segment; and live data relevant to whether a jam condition currently exists on that segment, the method comprising:

examining for consistency the live data for at least some, and generally each segment with the respective jam probability or historic travel times for that segment;

establishing any deviation trend in the consistency; and outputting an indication of any deviation trend.

According to another aspect of the invention there is provided a system arranged to generate map data indicating a deviation trend from expected jam conditions on a set of segments in an area covered by an electronic map, each segment having associated therewith:

a jam probability, the jam probability indicating the likelihood of a jam on that segment; and live data relevant to whether a jam condition currently exists on that segment, the system comprising a processor arranged to:

examine for consistency the live data for at least some, and generally each segment with the respective jam probability or historic travel times for that segment;

establish any deviation trend in the consistency; and output an indication of any deviation trend.

As will be appreciated the system and/or processor may be at least part of a server or a navigation device.

Any of the methods in accordance with the present invention may be implemented at least partially using software e.g. computer programs. The present invention thus also extends to a computer program comprising computer readable instructions executable to perform a method according to any of the aspects or embodiments of the invention.

The invention correspondingly extends to a computer software carrier comprising such software which when used to operate a system or apparatus comprising data processing means causes in conjunction with said data processing means said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described, by way of example only, with reference to the accompanying Figures, in which.

DETAILED DESCRIPTION OF THE FIGURES

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that the teachings of the present invention even have utility in circumstances, where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
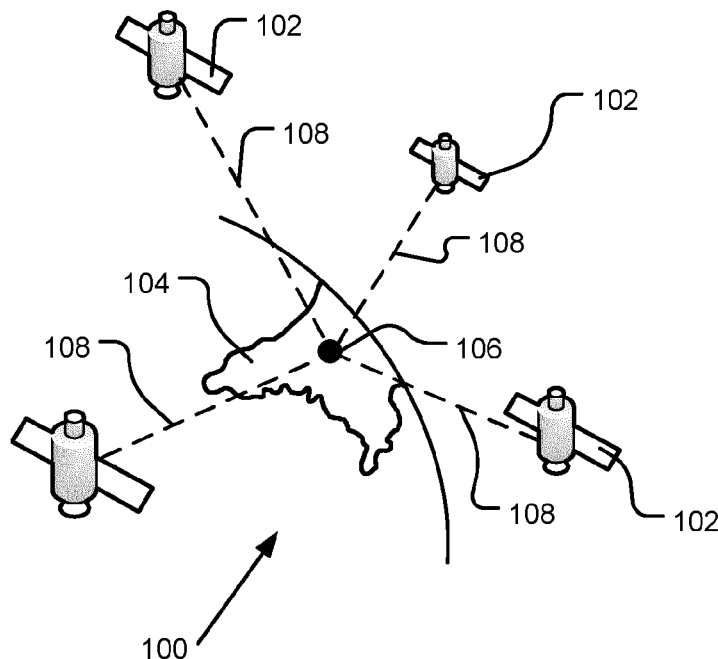
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
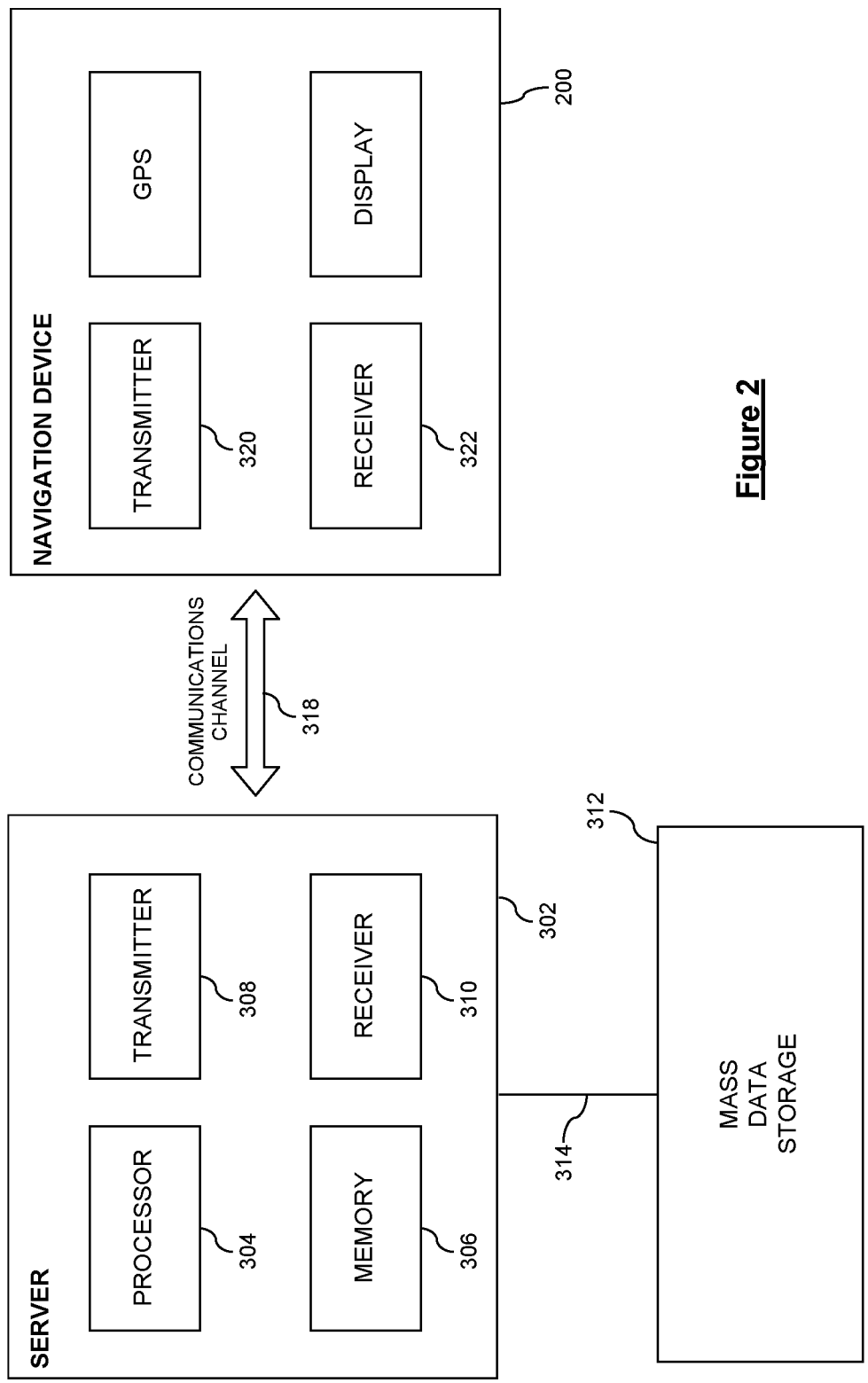
FIG. 2 is a schematic diagram of a communications system for communication between a navigation device and a server.

Turning to FIG. 2, a navigation device 200 (i.e. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
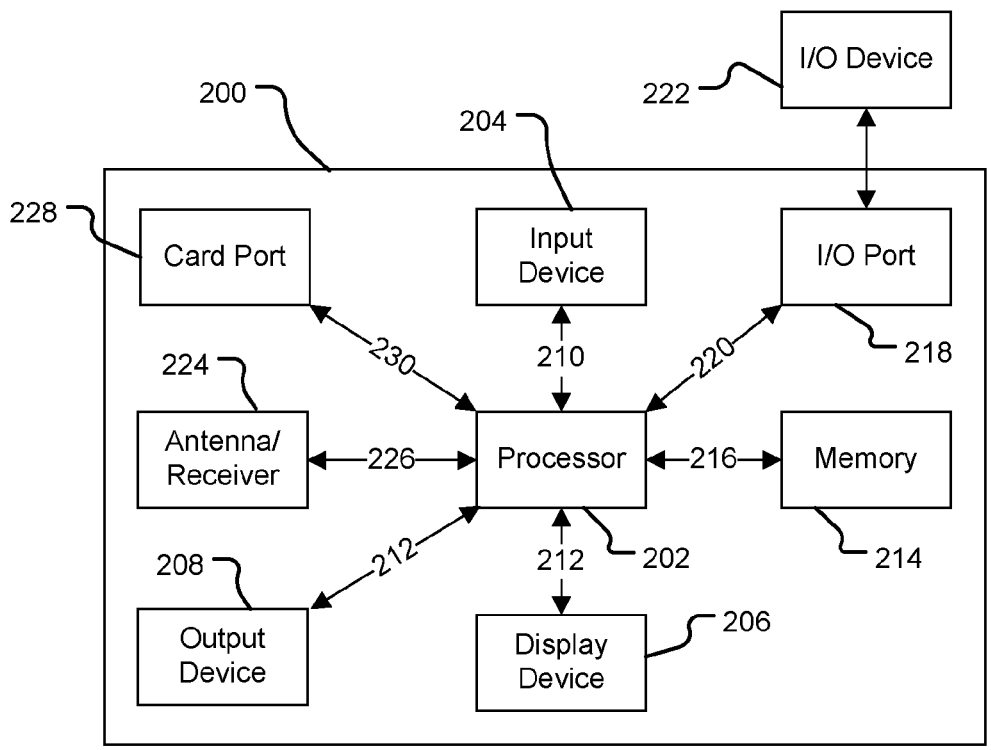
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touch-screen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like).

FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
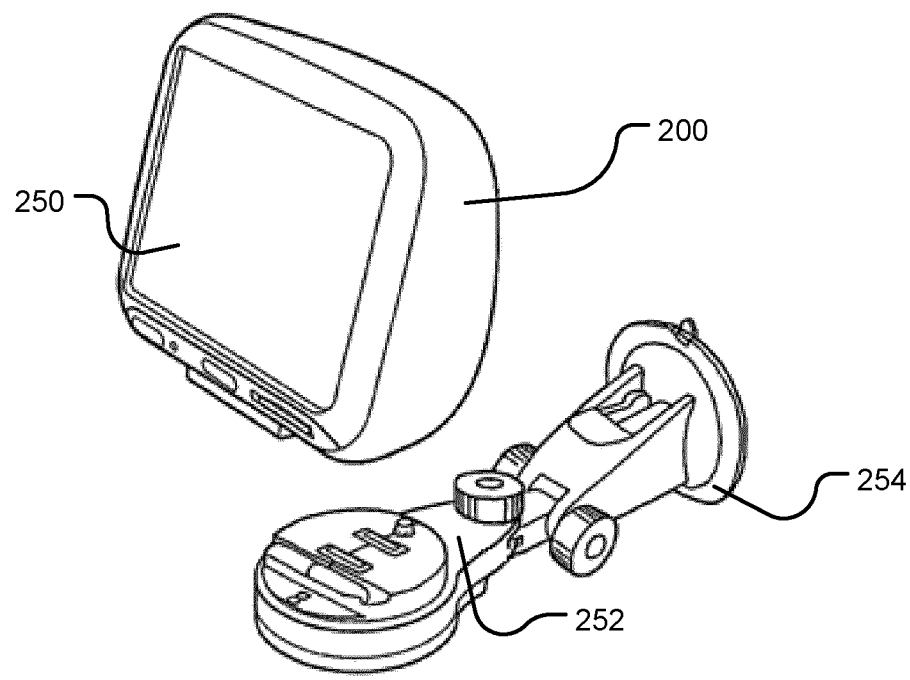
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Figure 5:
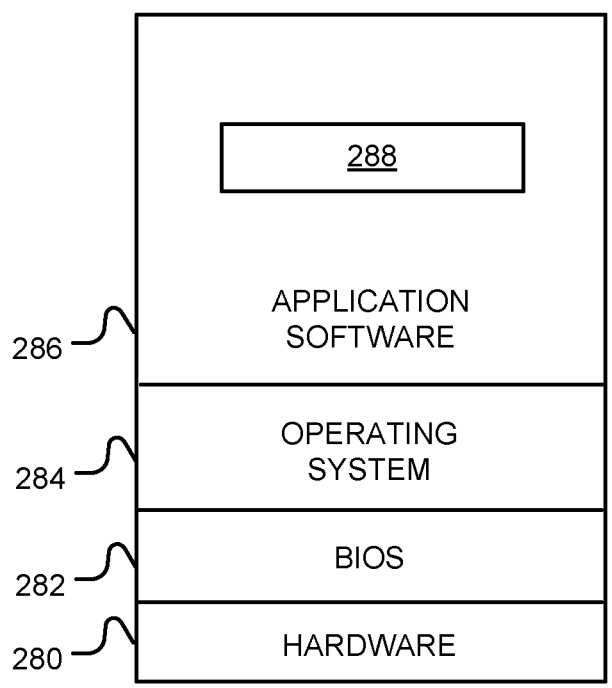
FIG. 5 is a schematic representation of an architectural stack employed by the navigation device of FIG. 3.

Turning to FIG. 5, the processor 202 and memory 214 cooperate to support a BIOS (Basic Input/Output System) 282 that functions as an interface between functional hardware components 280 of the navigation device 200 and the software executed by the device. The processor 202 then loads an operating system 284 from the memory 214, which provides an environment in which application software 286 (implementing some or all of the described route planning and navigation functionality) can run. The application software 286 provides an operational environment including the Graphical User Interface (GUI) that supports core functions of the navigation device, for example map viewing, route planning, navigation functions and any other functions associated therewith. In this respect, part of the application software 286 comprises a view generation module 288.

In the embodiment being described, the processor 202 of the navigation device is programmed to receive GPS data received by the antenna 224 and, from time to time, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, a time stamp and an accuracy report.

In one embodiment the data is stored substantially on a periodic basis which is for example every 5 seconds. The skilled person will appreciate that other periods would be possible and that there is a balance between data resolution and memory capacity; i.e. as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time.

In some embodiments, it may be found that the quality of the captured data reduces as the period increases and whilst the degree of degradation will at least in part be dependent upon the speed at which the navigation device 200 was moving a period of roughly 15 seconds may provide a suitable upper limit.

Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (i.e. the GPS data and the time stamp) to the server 150. In some embodiments in which the navigation device 200 has a permanent, or at least generally present, communication channel 152 connecting it to the server 150 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 202 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214 or card within the port 228.

In other embodiments, which do not have a generally present communication channel 152 the processor 202 may be arranged to upload the record to the server 152 when a communication channel 152 is created. This may for example, be when the navigation device 200 is connected to a user's computer. Again, in such embodiments, the navigation device may be arranged to buffer the GPS fixes within the memory 214 or on a card inserted in the port 228. Should the memory 214 or card inserted in the port 228 become full of GPS fixes the navigation device may be arranged to deleted the oldest GPS fixes and as such it may be thought of as a First in First Out (FIFO) buffer.

In the embodiment being described, the record of the whereabouts comprises one or more traces with each trace representing the movement of that navigation device 200 within a 24 hour period. Each 24 is arranged to coincide with a calendar day but in other embodiments, this need not be the case.

Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts.

The server 150 is arranged to receive the record of the whereabouts of the device and to store this within the mass data storage 160 for processing. Thus, as time passes the mass data storage 160 accumulates a plurality of records of the whereabouts of navigation devices 200 which have uploaded data.

As discussed above, the mass data storage 160 also contains map data. Such map data provides information about the location of road segments, points of interest and other such information that is generally found on map.

Figure 6:
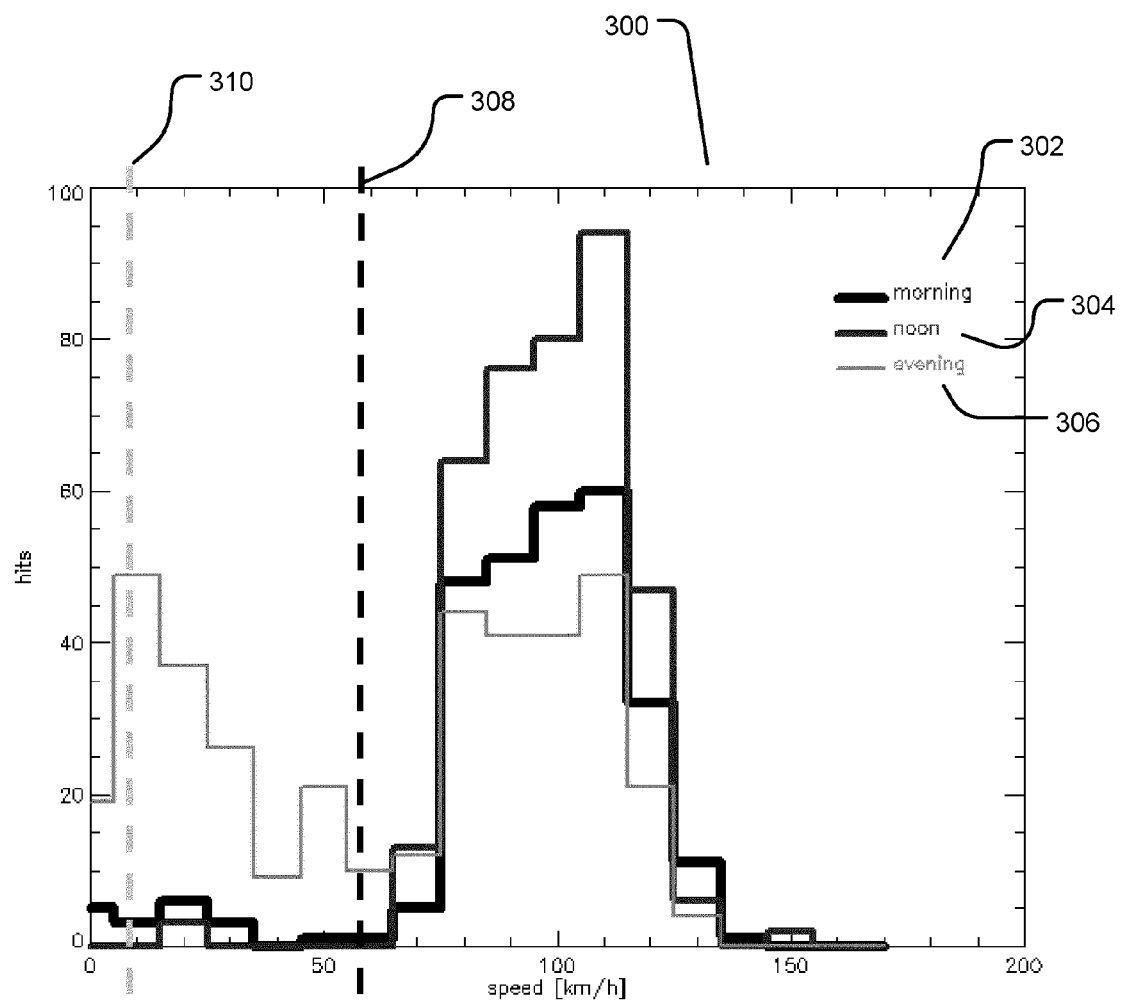
FIG. 6 is an average speed of travel across a segment histogram for three different time periods, 'morning', 'noon' and 'evening'.

Referring now to FIG. 6, this shows generally at 300 a histogram of average speeds of travel across a segment for three particular periods, morning 302, noon 304 and evening 306. The average speeds of travel across a segment, which may have been calculated from raw data such as historic travel times across the segment, are examples of historic travel data. The histogram 300 may be considered to represent historic data in the sense that the data recorded is not live data. The data is not therefore a direct result of raw data collection occurring substantially at the current time, recording actual events on the road segment within for example the last fifteen minutes. The data may however be used to predict what may be occurring on the segment at the present time in view of patterns occurring in traffic levels and behaviour.

The data for completion of the histogram 300 (historic average speeds of travel across the segment) were calculated using traces of the type described above, recorded by the server 150. If the navigation device's 200 location is known according to a trace, then the time passing between it entering and leaving the segment may be recorded. As will be appreciated, an average speed of travel across the segment can then be calculated assuming the segment distance is known.

The histogram 300 suggests that in the morning 302 and noon 304 periods there was relatively little slow moving traffic, whereas in the evening period 306 there was substantially more relatively slow moving traffic. The histogram 300 further suggests that in all three periods 302, 304 and 306 there was a substantial quantity of relatively fast moving traffic.

Shown on histogram 300 is a jam threshold speed 308 selected to be at 60 km/h. The jam threshold speed is an example of a jam condition. The jam threshold speed is the average speed of travel across the segment below which the travel is considered to have been jammed. In this embodiment the jam threshold speed was selected simply on the basis of a subjective view on what average speed should be considered jammed over the particular segment. In other embodiments however the jam threshold speed may be selected according to alternative criteria (e.g. a percentage of the average speed of travel across the segment during a period in the early morning, when the influence of other vehicles may be negligible, i.e. a free-flow speed). In other words, the jam threshold speed may be a selected percentage of the free-flow speed for the segment, the free-flow speed being the average speed of travel across the segment recorded during a selected low traffic period. As will be appreciated, once a jam threshold speed has been defined, all average speeds of travel across the segment below this speed are considered jammed.

Also shown on the histogram 300 is a jam speed 310 of 10 km/h. As can be seen the jam speed 310 is time independent i.e. the same jam speed 310 is provided for all three periods 302, 304 and 306. In this embodiment the jam speed 310 has been selected to be the mode of hits below the jam threshold speed 308. It is therefore an indication of the most likely average speed of travel across the segment when there is a jam. In other embodiments the jam speed 310 may be defined differently and this is discussed later.

With reference to the histogram 300 a method of calculating time dependent jam probabilities will be explained. As will be appreciated the histogram 300 shows the total number of hits above and below the jam threshold speed 308 for each period 302, 304, 306. Consideration of these totals gives a ratio for each period of jammed versus non-jammed travelling. This in turn allows the calculation of a jam probability for each time period. A jam probability calculated in this would be an example of generated segment data. By way of example, if the ratio of jammed hits to non-jammed hits is 30:70 for a particular period, a jam probability for that period may be 30%. A calculation such as this may be expressed as a function. This jam probability may then be associated with the relevant segment as segment data, giving a jam probability for travel in a particular period (e.g. mornings). The jam speed may be used in conjunction with the jam probability to give not only the likelihood of a jam but further the likely average speed of travel across the segment in the event of a jam. In this example the jam probability is based entirely on historic data. As discussed later, jam probabilities may be calibrated based on live data.

Figure 7A:
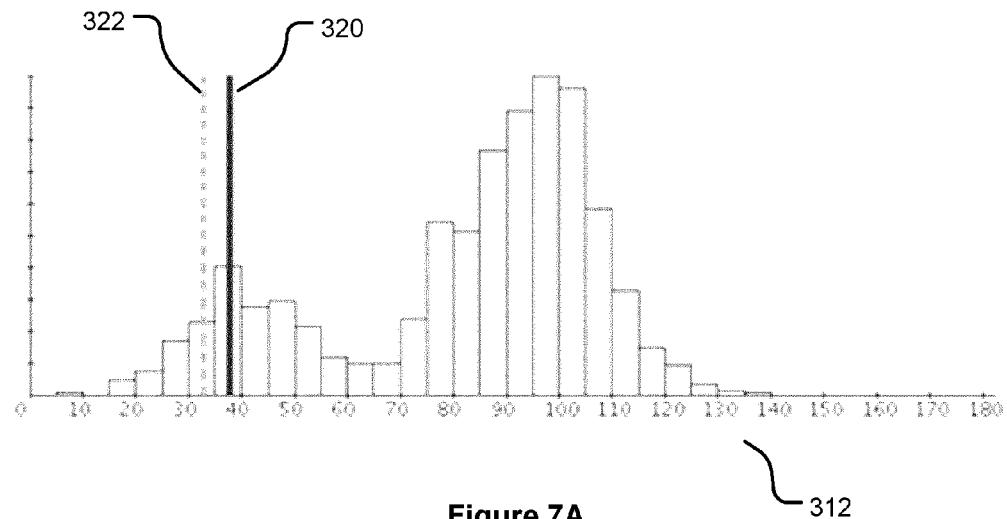
FIG. 7A is an average speed of travel across a segment histogram identifying possible jam speeds.
Figure 7B:
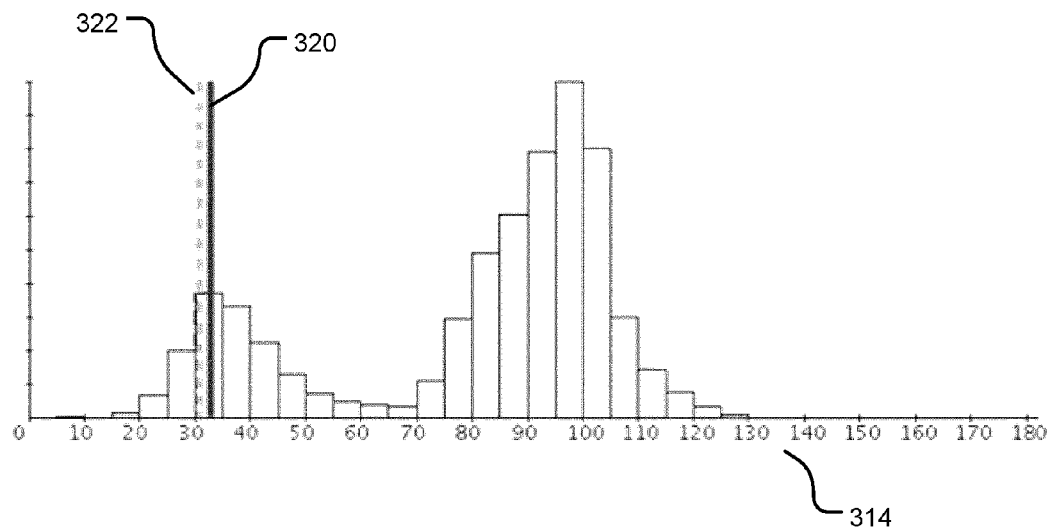
FIG. 7B is an average speed of travel across a segment histogram identifying possible jam speeds.
Figures 7C, 7D:
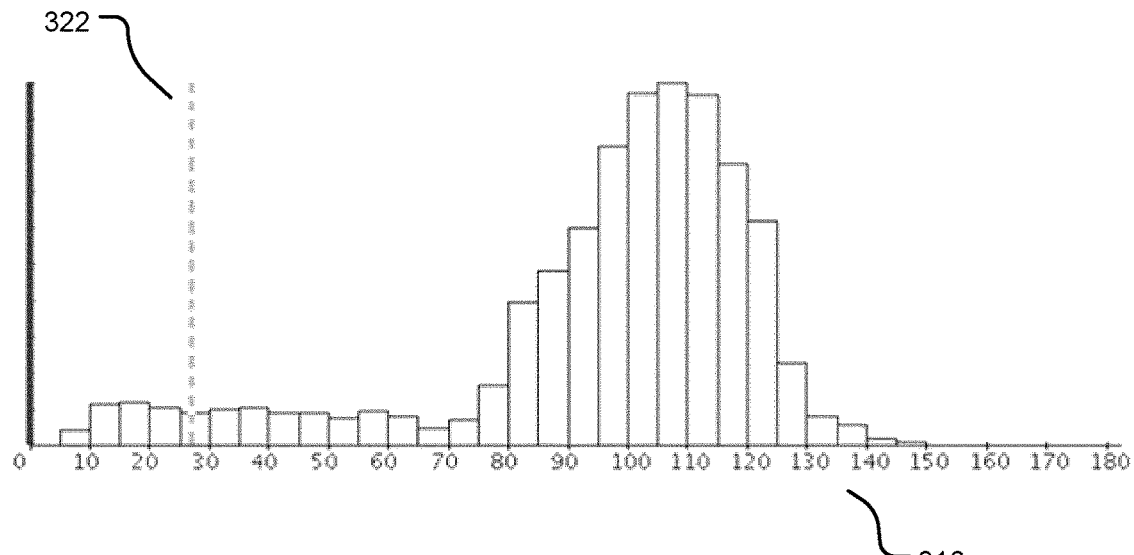
FIG. 7C is an average speed of travel across a segment histogram identifying a possible jam speed.
FIG. 7D is an average speed of travel across a segment histogram identifying a possible jam speed.

Referring now to FIGS. 7A-7D, alternative criteria for defining the jam speed are illustrated. FIG. 7A shows a histogram 312, FIG. 7B a histogram 314, FIG. 7C a histogram 316 and FIG. 7D a histogram 318. These histograms 312, 314, 316 and 318 each show historic average speeds of travel across a segment for a single period. As with histogram 300 of FIG. 6 they all use historic data.

In both histograms 312 and 314 there is a clear low speed mode 320. Assuming that the jam threshold speed has been selected to be above the low speed mode 320, the low speed mode 320 may be particularly suitable for selection as the jam speed. For comparison a fifth percentile 322 is also shown in both histograms 312 and 314.

In both histograms 316 and 318 there is either no low speed mode or it is far less obvious. In this case in particular a percentile such as the fifth percentile 322 may be used as the jam speed.

In other embodiments there are still further options for selecting the jam speed. The jam speed may for example be an average of all average speeds of travel across the segment falling below the jam threshold speed.

Figure 8:
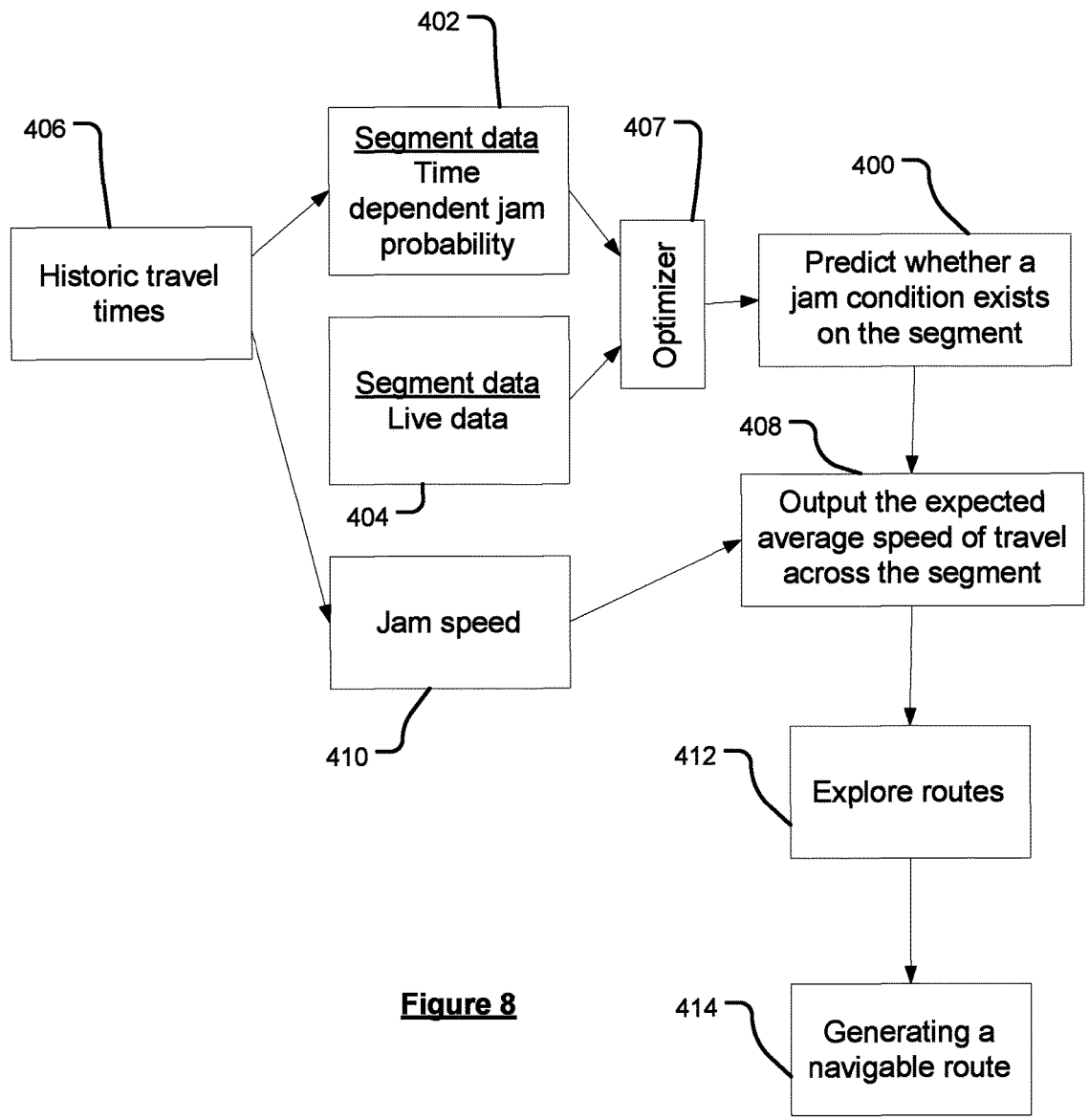
FIG. 8 is a flow diagram illustrating an embodiment of the method of the invention.

Referring now to FIG. 8 in combination with FIG. 2, a flow diagram illustrating an embodiment of the invention is shown.

In a prediction step 400 a prediction of whether a jam condition exists on a segment in the area covered by an electronic map is made. The nature of the prediction depends on segment data available for the segment in question. In this embodiment the segment data comprises a time dependent jam probability 402 and live data 404 relating to the segment.

The time dependent jam probability 402 has been selected from multiple other time dependent jam probabilities as corresponding to the present time (e.g. Monday morning between 8.30 am and 8.45 am.) Each time dependent jam probability has been calculated using historic travel times 406 for the segment in question at the relevant time.

The live data 404 is information relating to traffic conditions on the segment at the present time, for example live travel times over the segment from GPS probes or journalistic data reporting on traffic conditions on the segment.

The segment data is processed by an optimizer 407 run by the processor 154 of the server 150. In this embodiment the optimiser defaults to a prediction of a jam condition if the time dependent jam probability exceeds the pre-defined value of 70%. The optimizer 407 also however takes account of the live data according to a weighted regime. Where there is a significant quantity of consistent live data 404 this is weighted heavily, whereas where the live data is inconsistent, unreliable and/or small in quantity it is weighted lightly. The optimizer 407 therefore evaluates the significance and/or reliability of the live data 404 and checks for consistency with the prediction it would otherwise make based on the time dependent jam probability 402 alone. Having evaluated the live data 404 the optimizer 407 determines whether there is a need to over-rule a prediction on whether a jam condition exists that it would otherwise make and outputs an expected average speed of travel across the segment according to its final prediction.

The output from the optimizer 407 occurs in an output step 408. Where the prediction is that a jam condition exists, the output expected average speed of travel across the segment is a jam speed 410. The jam speed 410 is calculated in accordance with historic travel times 406 considered jammed, i.e. below a jam condition speed. Where the prediction is that a jam condition does not exist, the output expected average speed of travel across the segment is a default speed, in this case an average of all available historic average speeds of travel across the segment during the time period in question (e.g. Monday morning between 8.30 am and 8.45 am).

In this embodiment the output is communicated via the transmitter 162, over the communications channel 152 to the navigation device 200. On the navigation device possible routes are explored in an exploration step 412 based on the route parameters requested (such as origin and destination) and using map data stored on the navigation device 200. The aim of this exploration may be to find the quickest or most fuel efficient route (although the skilled man will appreciate that many other factors may also be accounted for). Where segments for which an output has been produced are considered for the route, the expected average speed of travel across the segment is used, be that a jam speed or a default speed. Finally a navigable route is generated in a generation step 414.

As will be appreciated the flow diagram of FIG. 8 could be performed exclusively by a navigation device 200 when offline. It may be for example that information (e.g. live data) is collected/captured by the navigation device 200 as it moves and that other segment data is stored thereon.

In the embodiment described above the time dependent jam probability itself is not calibrated by factoring in live data. Instead live data is simply used to perform a final check. In alternative embodiments however live data may additionally or alternatively be used to calibrate the time dependent jam probability by the incorporation of the live data with the historic travel times by the optimizer. Further there are many other possible ways in which the live data may be used to impact on whether a jam condition is predicted e.g. altering the jam probability percentage required or even switching to an entirely different jam probability if it is more appropriate.

Although in the embodiment described above an expected average speed of travel across the segment is output, the skilled man will readily appreciate that many additional or alternative outputs are possible, for example the issue of a jam warning or an instruction to maintain or adjust the status quo. Outputs such as these may be all that is required for the navigation device 200 to select the appropriate expected average speed of travel across the segment. Indeed it should further be noted that although some of the method steps are described as occurring on the server 150 and some on the navigation device 200, that any of the steps may be performed centrally or locally.

Figure 9:
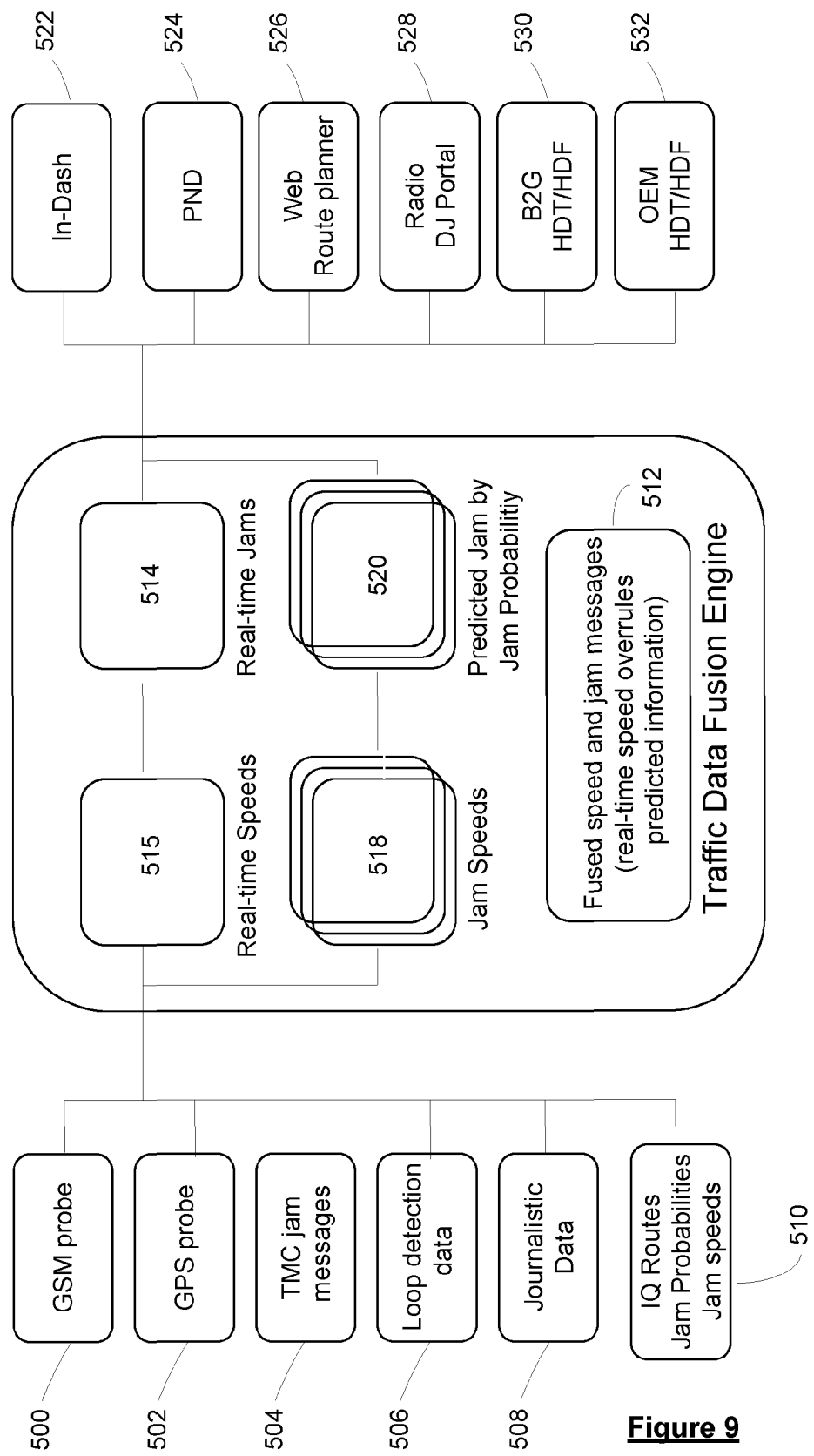
FIG. 9 is a schematic view illustrating an architecture for route generation.

Referring now to FIG. 9 an architecture for route generation is shown, illustrating potential data inputs, processing and output to devices for use. The architecture includes several inputs: live Global System for Mobile Communication (GSM) probe data 500, live Global Positioning System (GPS) probe data 502, live Traffic Message Channel (TMC) jam messages 504, live loop detection data 506, live journalistic data 508 and historic jam probability and jam speed data 510.

In a processing step the inputs 500, 502, 504, 506, 508 and 510 are processed by an optimizer, in this case a data fusion engine 512. live GSM probe data 500, live GPS probe data 502, live TMC jam messages 504, live loop detection data 506 and live journalistic data 508 is used to give an indication of any real-time jams 514 currently occurring on a segment and to give an approximation of real-time travel speeds 516. The historic jam probability and jam speed data 510 give a jam speed 518 and a jam condition prediction 520 based on historic data. The data fusion engine 512 processes the data coming from live and historic sources to predict whether a jam condition exists on a segment and if so to provide a jam speed. This data is then outputted.

The architecture includes several devices to which the output may be sent: In-dash navigation device 522, personal navigation device 524, web based route planner 526, radio DJ portal 528, business to government (B2G) host digital terminal (HDT) or hierarchical data format (HDF) 530 or original equipment manufacturer (OEM) host digital terminal (HDT) or hierarchical data format (HDF) 532. When the output has been received by the device it may for example use it in route planning, or to display a condition report on all or part of a network.

Figure 10:
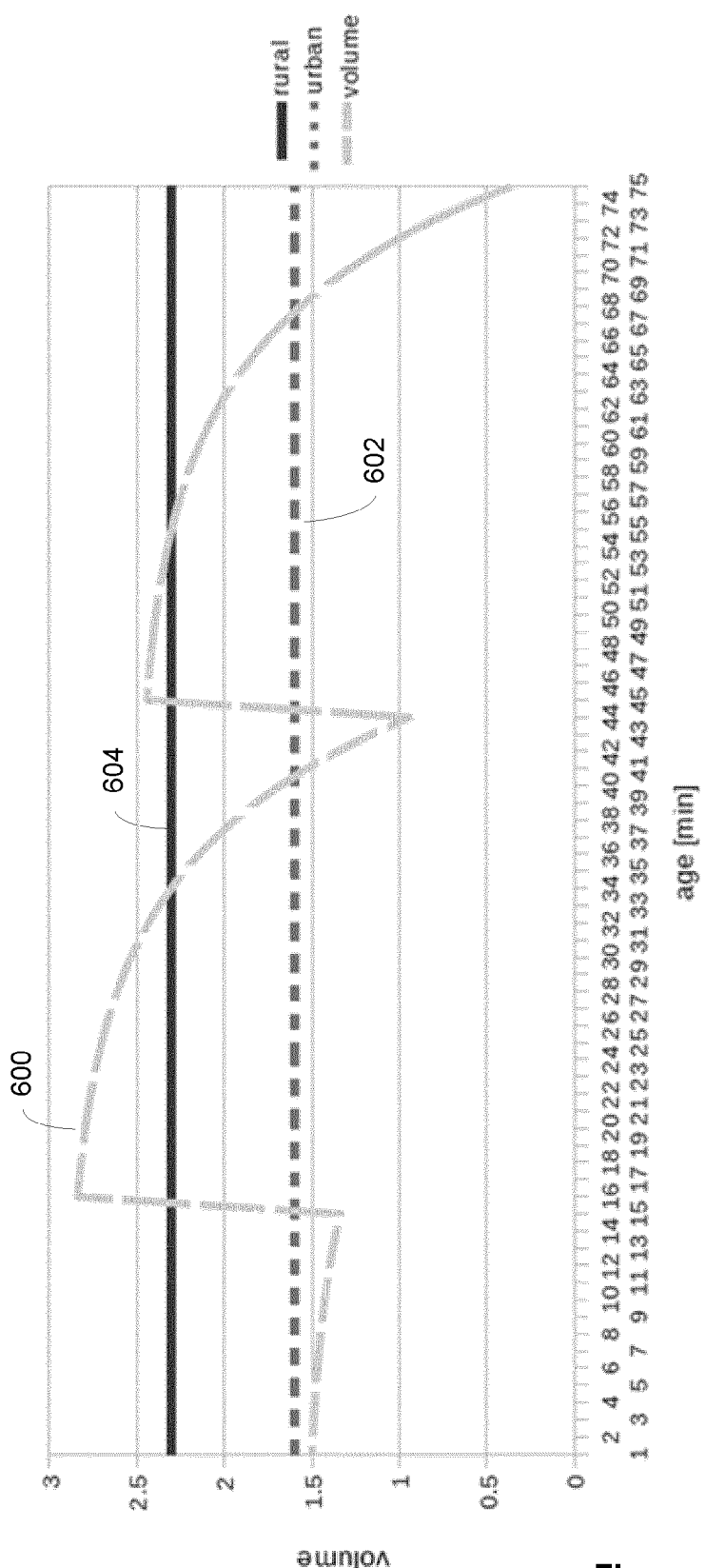
FIG. 10 is a live data volume versus time plot with jam probability use cut off volumes.

Referring now to FIG. 10 a plot indicating the variability in volume of live data 600 available over a period is shown. The plot also shows an urban lower cut-off threshold 602 for use of live data 600 and a rural lower cut-off threshold 604 for use of live data.

In some embodiments it is advantageous to make use of live data, either to calibrate the jam probability or to check whether or not a jam condition prediction should be made. Where however there is a low volume of live data, its use may be counter productive, as traffic data tends to have a stochastic component. Consequently in some embodiments a lower cut-off threshold for live data volume may be set below which it is not used. FIG. 10 illustrates that this lower threshold may vary. In this embodiment the lower threshold varies depending on the nature of the road covered by the surface (either rural or urban). Such a variation may be justified if for example live data from rural segments is known to be more stochastic than live data from urban segments.

In the embodiment of FIG. 10 live data is only used on urban segments when it is above the urban lower cut-off threshold 602 and is only used on rural segments when it is above the rural lower cut-off threshold 604.

Figure 11:
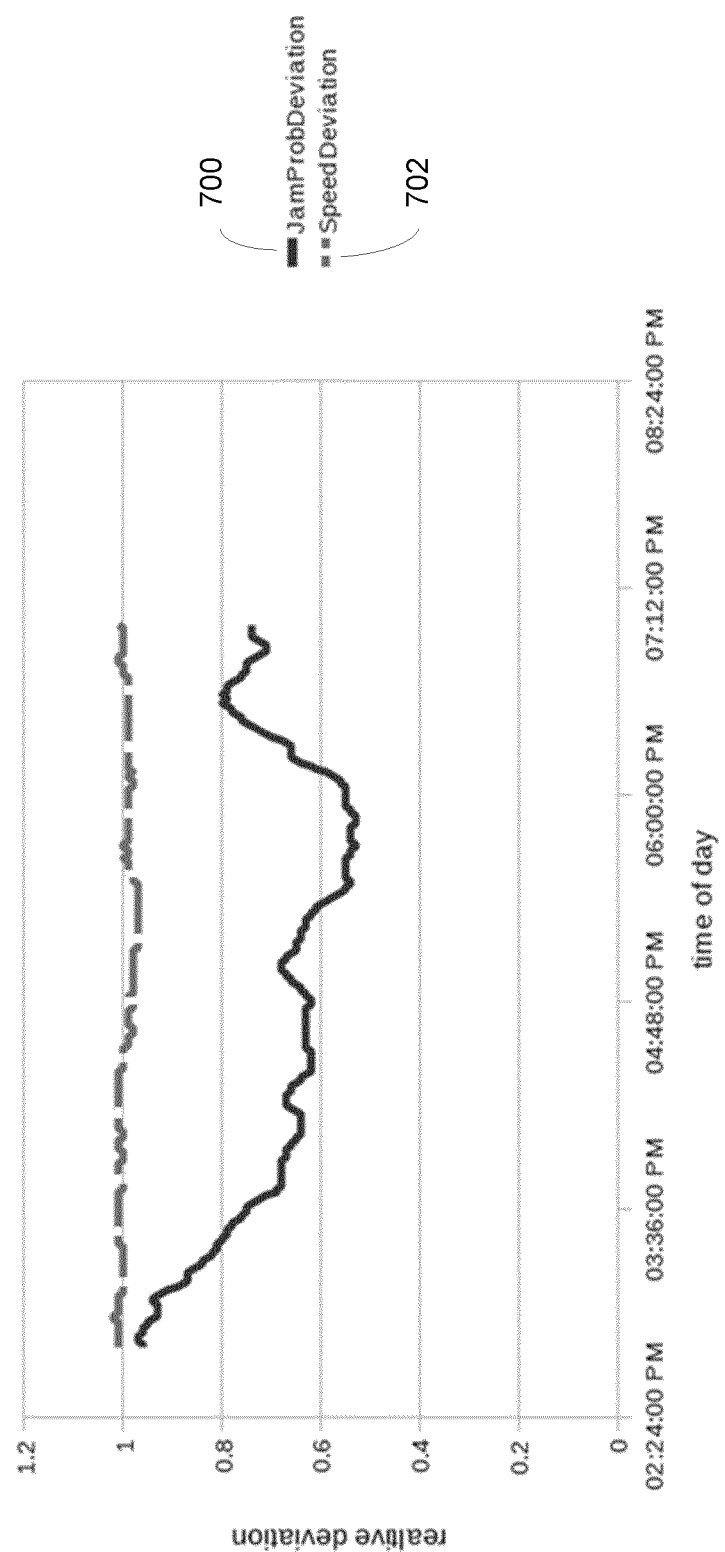
FIG. 11 is a plot of jam probability deviation and speed deviation against time illustrating one possible part of a regional check.
Figure 12:
FIG. 12 is a plot of jam probability deviation and speed deviation against time illustrating one possible part of a regional check.

With reference now to FIGS. 11 and 12 regional checks and deviation trends for sets of segments are explained.

A regional check may be performed where live data for a set of segments is checked for consistency with their respective jam probabilities and/or historic travel times used for their calculation and/or predictions of whether jam conditions exist based on the jam probabilities. The results of the check on each segment can then be concatenated and evaluated for deviation trends. This may be particularly useful because traffic volume and/or flow may be a regional phenomenon (i.e. the traffic situation on one particular segment may well be influenced by the traffic situation on surrounding segments). Regional adaptation may therefore be particularly useful in relation to predetermined map areas, predetermined radii, likely routes into or out of an area, predetermined travel directions, known bottle-necks and/or traffic hotspots.

Where the check indicates a deviation trend from what would be expected were jam predictions to be made from jam probabilities based on historic average speeds of travel, mitigating steps may be taken to alter jam predictions. These steps may occur for the segments in the set but may also occur for other segments likely to be influenced by one or more of the segments in the set.

Potential steps include: 1) adjusting the jam probability required in order for a jam condition to be predicted; 2) the use of live data or additional live data in the jam probability calculation; 3) adjusting the weighted or probabilistic average to favour or further favour live data; 4) using the inconsistency to over-ride a jam condition prediction or make a jam condition prediction where one would not otherwise be made; and 5) initiating a switch to use of one or more different jam probabilities more consistent with the live data. Such steps may be expressed as map data for the segments concerned.

In some alternative embodiments a deviation trend may lead to a partial or complete over-riding of the use of jam probabilities for a period. It may be for example that the live data indicates that the jam probabilities are completely inappropriate for use in predicting whether jam conditions exist for a particular period.

As will be appreciated performing a regional check may allow accurate adjustments to jam probabilities for segments where there is little or no live data by drawing inferences from other segments included in the set. Further the regional check may provide an enhanced understanding of conditions on large parts of a network, reducing the likelihood of misinterpretation.

In some embodiments a deviation trend may be assessed by calculating a percentage of segments in the set that are jammed according to live data (e.g. by comparing each average speed of travel across the segment with the jam threshold speed and comparing the proportion above and below that jam threshold speed). This can then be compared with an average over all jam probabilities for the segments in the set to give a jam probability deviation. The jam probability deviation may then be smoothed over a period (e.g. 30 minutes).

As will be appreciated the calculation of a jam probability deviation may allow subtle distinctions to be drawn between traffic conditions on segments in the set and ultimately potentially segments outside of the set.

FIG. 11 shows a graph of relative deviation against time of day. Plotted on the graph is a jam probability deviation for a set of segments 700 and a speed deviation for the same set 702. The speed deviation shows the average deviation from free flow speed for all segments in the set. The set of segments consists of a number of known traffic bottle necks in a particular city.

As can be seen in the example of FIG. 11 the traffic situation is unusual because there is up to approximately a 45% reduction in the jam probability when live data is considered; it can be seen that the relative deviation for the line 700 drops to roughly 0.55. This indicates that for the traffic bottle necks in the set, there is a reduced chance of there being a jam; i.e. that it is more likely that there will be free flowing traffic. This may be caused by an unusual drop in traffic quantity. As might be expected therefore there is virtually no speed deviation; i.e. the relative deviation for the line 702 remains substantially at a value of 1. A regional check giving a deviation trend of this nature may prompt the reduction of jam probabilities for other segments in the city, even where there is little or no live data for these other segments. That is data from the set of segments has been used to alter segments in neighbouring areas. This is because non-jammed traffic bottle necks may well be indicative of a reduced likelihood of jams in the surrounding network.

FIG. 12 is similar to FIG. 11 with the graph illustrating another regional check giving a different traffic situation. Here a jam probability deviation for a set a segments 800 is low, indicating that the likelihood of a jam is substantially as would be expected according to historic trends; i.e. the line 800 remains substantially around 1 indicating the live data backs up the jam probability. Nonetheless the speed deviation 802 illustrates a drop across the segments in average speed; the line 802 is reduced below a relative deviation of 1. Thus, the graph shows that jam probability and average speed need not follow each other. The traffic situation as illustrated by FIG. 12 may for example be the result of snow, causing traffic speed to be generally reduced without there being an increased likelihood of jams. The regional check has therefore correctly identified that jam probabilities are relatively normal despite average speed being reduced.

The invention claimed is:

1. A method of generating and using segment data for a segment of an electronic map, the electronic map being representative of a network in an area covered by the electronic map and comprising a plurality of segments, each segment representing a navigable segment of the network, the method comprising using a processing apparatus to:
    collect historic travel data for the segment of the electronic map relating to the movement of a plurality of navigation devices along the navigable segment of the network represented by the segment, and using the historic travel data to generate a plurality of speeds of travel across the segment;
    generate a free-flow speed for the segment using at least some of the plurality speeds of travel, wherein said free-flow speed is an average speed of travel across the segment during a period of time in which there is no or substantially little traffic on the navigable segment of the network;
    define a jam condition for the segment, such that where the jam condition is satisfied the segment is classified as jammed and otherwise as not jammed, the jam condition being a jam threshold speed, wherein the jam threshold speed is a selected percentage of the free-flow speed for the segment;
    generate a jam probability for the segment, wherein the jam probability is representative of the likelihood of a jam on the navigable segment represented by the segment, and wherein the jam probability is calculated based on a ratio of speeds of travel across the segment above the jam threshold speed to speeds of travel across the segment below the jam threshold speed;
    generate a jam speed for the segment using at least some of the plurality of speeds of travel, the jam speed being indicative of the speed on the segment when the segment is classified as jammed, wherein the jam speed is a selected percentage or mode of speeds of travel across the segment below the jam threshold speed;
    associate the jam probability and the jam speed with the segment in the electronic map, the segment data for the segment comprising the jam probability and the jam speed; and
    use at least the segment data for the segment to at least one of: generate and provide a route across the electronic map; and determine and/or predict the existence of a jam on a navigable segment of the network and issue a jam warning.

2. A method according to claim 1 where the selected percentage of the free-flow speed is between 30% and 70%.

3. A method according to claim 1 where the historic travel data is grouped according to time of recordal allowing the generation of multiple time dependent jam probabilities for the segment.

4. A method according to claim 3 where jam probabilities are calculated according to or are at least influenced by one or more of: (i) the time of the year; (ii) the day of the week; (iii) the time of day; and (iv) the occurrence of a particular event or situation.

5. A method according to claim 1 where the jam speed is the average of substantially all speeds of travel across the segment below the jam threshold speed.

6. A method according to claim 1 where the speeds of travel across the segment form a multi-modal distribution, and the jam speed is a lower mode of the distribution.

7. A system arranged to generate and use segment data for a segment of an electronic map, the electronic map being representative of a network in an area covered by the electronic map and comprising a plurality of segments, each segment representing a navigable segment of the network, the system comprising: a processor; and a memory coupled to the processor, and the system being arranged to:
    collect historic travel data for the segment of the electronic map relating to the movement of a plurality of navigation devices along the navigable segment of the network represented by the segment, and using the historic travel data to generate a plurality of speeds of travel across the segment;
    generate a free-flow speed for the segment at at least some of the plurality speeds of travel, wherein said free-flow speed is an average speed of travel across the segment during a period of time in which there is no or substantially little traffic on the navigable segment of the network;
    define a jam condition for the segment, such that where the jam condition is satisfied the segment is classified as jammed and otherwise as not jammed, the jam condition being a jam threshold speed, wherein the jam threshold speed is a selected percentage of the free-flow speed for the segment;
    generate a jam probability for the segment, wherein the jam probability is representative of the likelihood of a jam on the navigable segment represented by the segment, and wherein the jam probability is calculated based on a ratio of speeds of travel across the segment above the jam threshold speed to speeds of travel across the segment below the jam threshold speed;
    generate a jam speed for the segment using at least some of the plurality of speeds of travel, the jam speed being indicative of the speed on the segment when the segment is classified as jammed, wherein the jam speed is a selected percentage or mode of speeds of travel across the segment below the jam threshold speed;
    associate the jam probability and the jam speed with the segment in the electronic map, the segment data for the segment comprising the jam probability and the jam speed; and
    use at least the segment data for the segment to at least one of: generate and provide a route across the electronic map; and determine or predict the existence of a jam on a navigable segment of the network and issue a jam warning.

8. A non-transitory computer readable medium comprising instructions which, when executed by a computer, cause the computer to perform a method of generating and using segment data for a segment of an electronic map, the electronic map being representative of a network in an area covered by the electronic map and comprising a plurality of segments, each segment representing a navigable segment of the network, the method comprising:
    collecting historic travel data for the segment of the electronic map relating to the movement of a plurality of navigation devices along the navigable segment of the network represented by the segment, and using the historic travel data to generate a plurality of speeds of travel across the segment;

generating a free-flow speed for the segment at at least some of the plurality speeds of travel, wherein said free-flow speed is an average speed of travel across the segment during a period of time in which there is no or substantially little traffic on the navigable segment of the network;

defining a jam condition for the segment, such that where the jam condition is satisfied the segment is classified as jammed and otherwise as not jammed, the jam condition being a jam threshold speed, wherein the jam threshold speed is a selected percentage of the free-flow speed for the segment;

generating a jam probability for the segment, wherein the jam probability is representative of indicating the likelihood of a jam on the navigable segment represented by the segment, and wherein the jam probability is calculated based on a ratio of speeds of travel across the segment above the jam threshold speed to speeds of travel across the segment below the jam threshold speed;

generating a jam speed for the segment using at least some of the plurality of speeds of travel, the jam speed being indicative of the speed on the segment when the segment is classified as jammed, wherein the jam speed is a selected percentage or mode of speeds of travel across the segment below the jam threshold speed;

associating the jam probability and the jam speed with the segment in the electronic map, the segment data for the segment comprising the jam probability and the jam speed; and using at least the segment data for the segment to at least one of: generate and provide a route across the electronic map; and determine or predict the existence of a jam on a navigable segment of the network and issue a jam warning.

9. A method according to claim 1 where the selected percentage of the free-flow speed is between 40% and 60%.

10. A method according to claim 1 where the selected percentage of the free-flow speed is substantially 50%.

* * * * *